A. C. TAYLOR.
ELECTRIC WELDING APPARATUS.
APPLICATION FILED JULY 23, 1917.

1,247,741.

Patented Nov. 27, 1917.
4 SHEETS—SHEET 1.

Inventor
Albertis C. Taylor.

By Fisher &...

Attorneys

A. C. TAYLOR.
ELECTRIC WELDING APPARATUS.
APPLICATION FILED JULY 23, 1917.
1,247,741.
Patented Nov. 27, 1917.
4 SHEETS—SHEET 2.
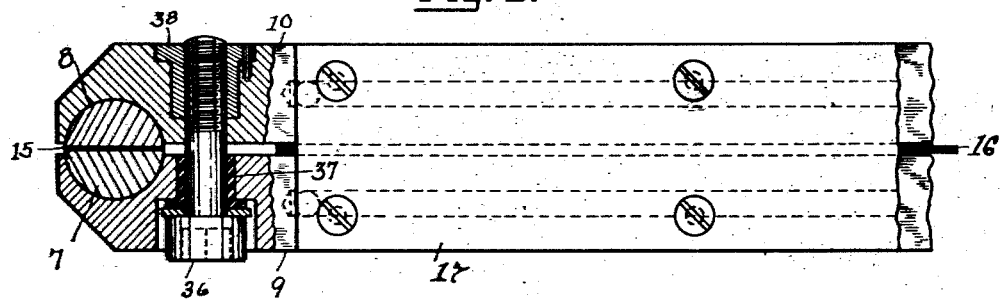
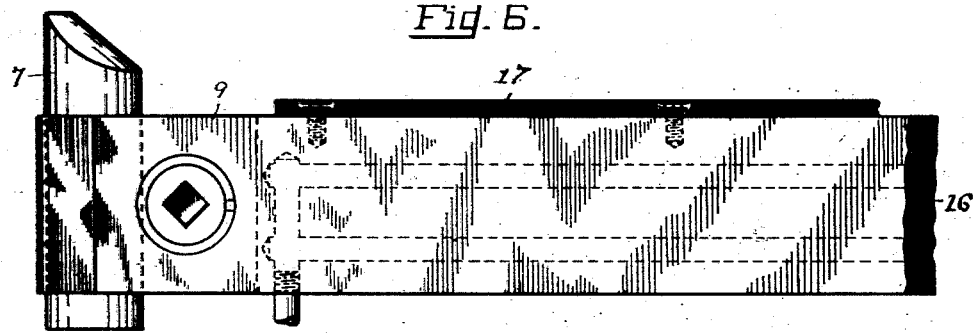
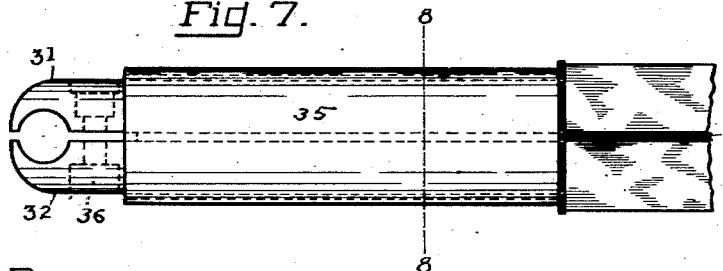
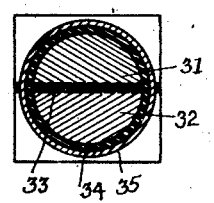
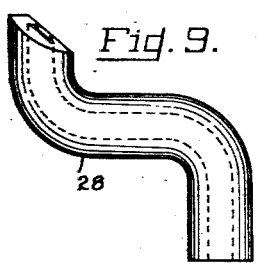
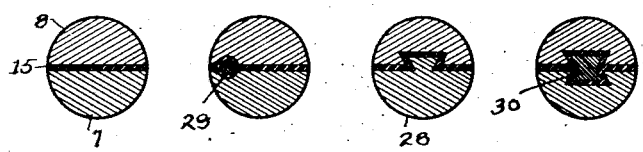
Albertis C. Taylor, Inventor
By Fisher & Moser, Attorneys

A. C. TAYLOR.
ELECTRIC WELDING APPARATUS.
APPLICATION FILED JULY 23, 1917.

1,247,741.

Patented Nov. 27, 1917.
4 SHEETS—SHEET 3.

A. C. TAYLOR.
ELECTRIC WELDING APPARATUS.
APPLICATION FILED JULY 23, 1917.

1,247,741.

Patented Nov. 27, 1917.
4 SHEETS—SHEET 4.

Inventor
Albertis C. Taylor.
By Fisher & Mosrt
Attorney

UNITED STATES PATENT OFFICE.

ALBERTIS C. TAYLOR, OF WARREN, OHIO.

ELECTRIC WELDING APPARATUS.

1,247,741.   Specification of Letters Patent.   Patented Nov. 27, 1917.

Application filed July 23, 1917. Serial No. 182,139.

*To all whom it may concern:*

Be it known that I, ALBERTIS C. TAYLOR, citizen of the United States, residing at Warren, in the county of Trumbull and State of Ohio, have invented certain new and useful Improvements in Electric Welding Apparatus, of which the following is a specification.

This invention relates to an improvement in electric welding apparatus, the primary object being to provide a practical and efficient organization of parts wherewith to practise the method of electric welding described in my application filed March 12, 1917, Serial No. 154,075, and which method involves the passing of two independent electric currents on crossed lines through two or more pieces of metal to produce an intense heating effect and a welded union at a definite place in the contacting faces of said pieces. A further object is to provide my improved apparatus with a transformer having two independent secondary coils or bands and a single primary coil, whereby two independent secondary welding currents may be obtained with a single primary current. Other objects and advantages of the invention are also hereinafter described.

Figure 1:
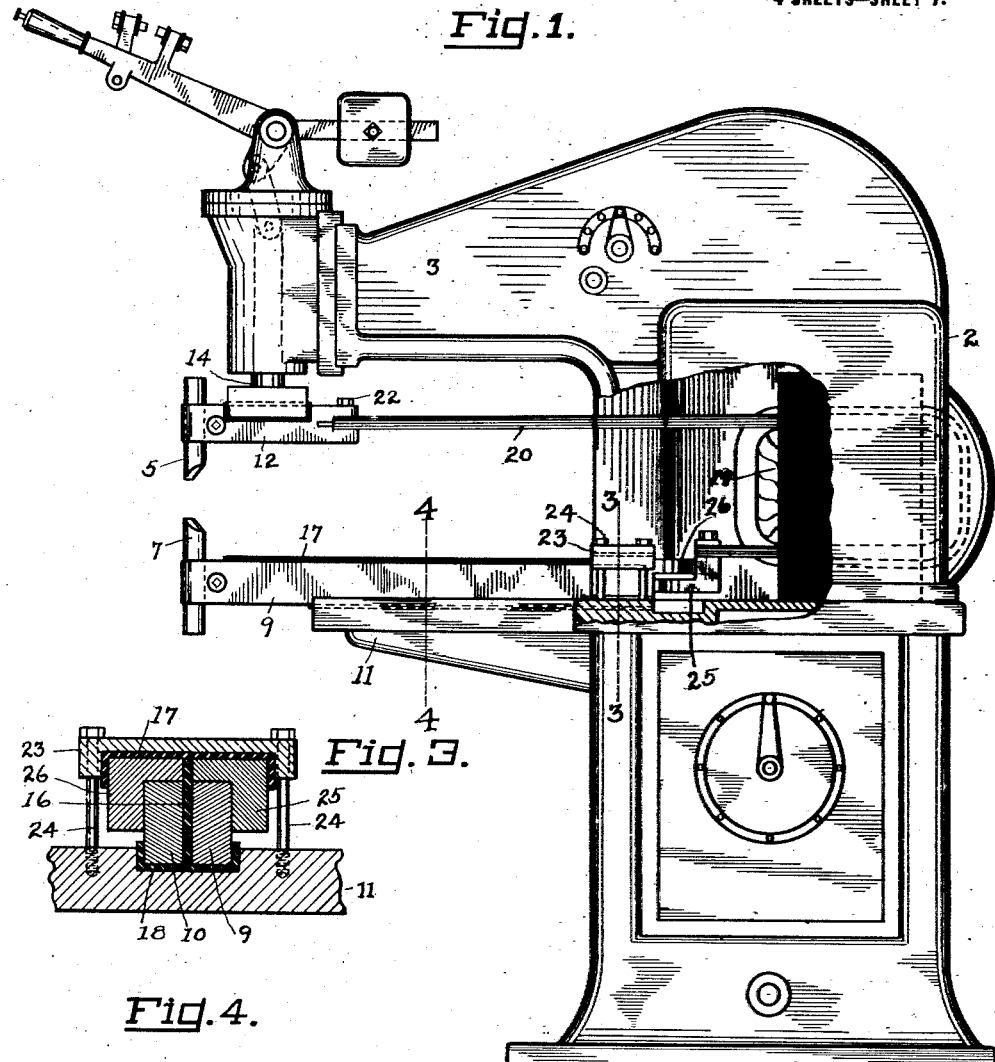
Figure 3:
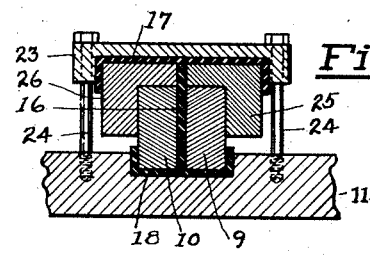
Figure 4:
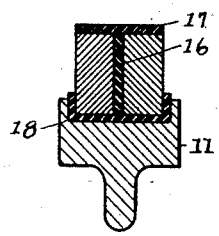
Figure 2:
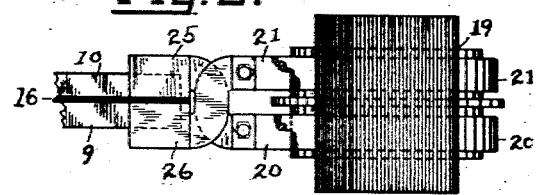
Figure 14:
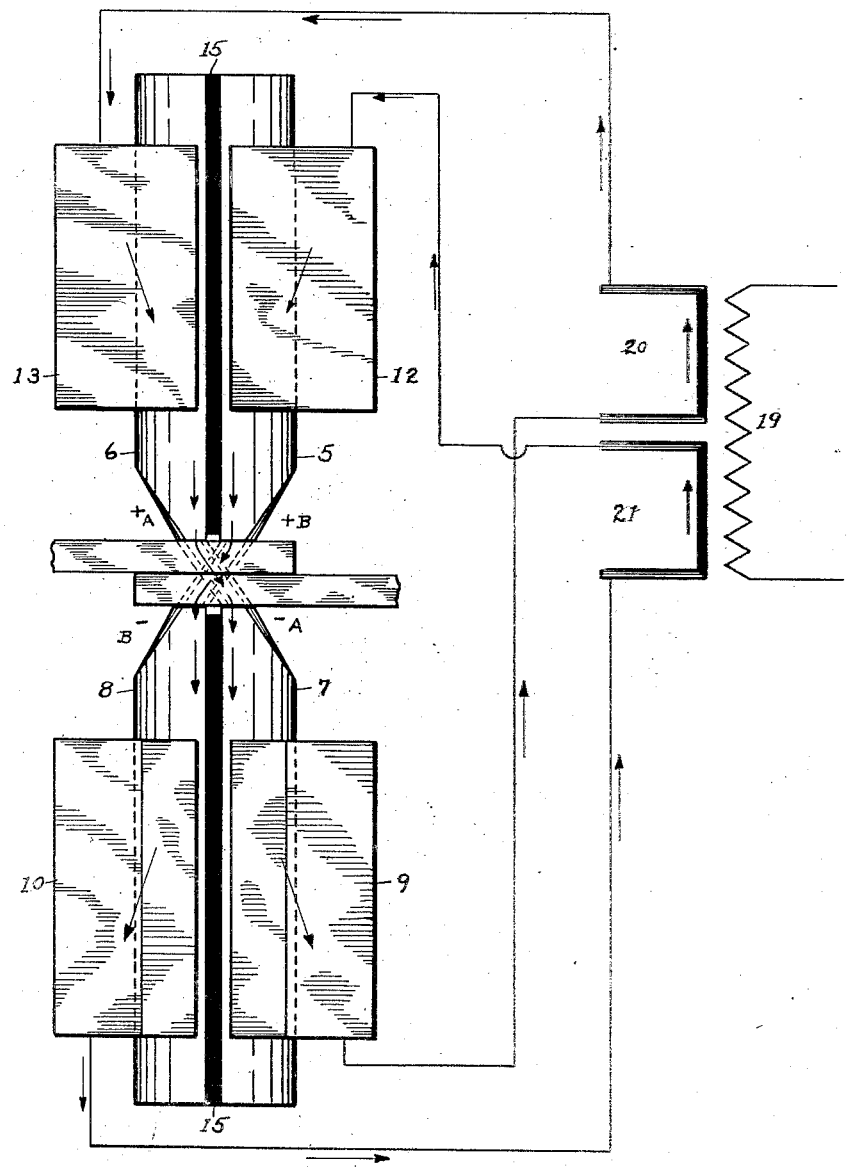
Figure 15:
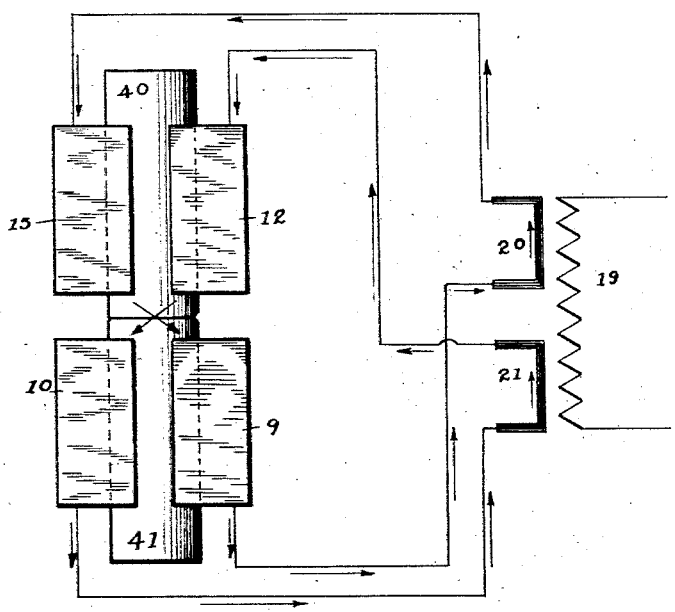
Figure 16:
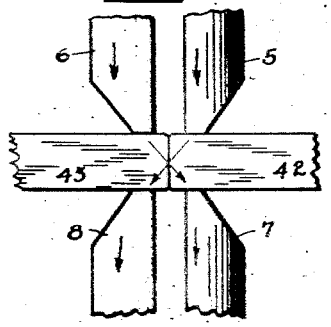
Figure 17:
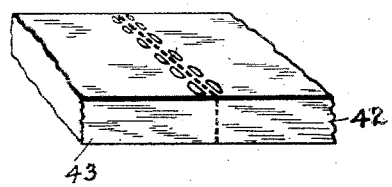

In the accompanying drawings, Figure 1 is a side elevation of one form of machine embodying my invention, a portion being broken away to disclose the transformer connections. Fig. 2 is a top plan view of the transformer with the upper part of the secondary bands broken away to show the crossed terminals beneath. Fig. 3 is a cross-section of the two copper conductors or horns and the secondary terminals where clamped together on lines 3—3, Fig. 1, and Fig. 4 is a cross-section on line 4—4, Fig. 1. Fig. 5 is a plan view of the lower horns with the clamping extremity broken away and showing electrodes and an insulated clamping screw. Fig. 6 is a side elevation of Fig. 5, showing water-circulating channels in dotted lines in the horn. Fig. 7 is a plan view of a round horn for use in welding tubes and the like, showing a sleeve for binding the two horns together and to serve as a guard for same. Fig. 8 is a cross section view of the horn on line 8—8, Fig. 7. Fig. 9 is a side view of a bent electrode adapted for use in corners and places not accessible with straight electrodes. Fig. 10 is a cross-section of the double electrode illustrated in Fig. 14. Fig. 11 is a cross-section of a double electrode having matched grooves and a locking wire. Figs. 12 and 13 are cross-sections of divided electrodes dove-tailed together, a construction especially adapted for use with the bent electrodes shown in Fig. 9. Fig. 14 is a diagrammatic view showing two sets of electrodes and the transformer circuits therefor for practising cross-welding in overlapping sheets of metal, and Figs. 15 and 16 are similar views showing two different butt-welding operations with the apparatus. Fig. 17 is a perspective view of two heavy plates welded together in the manner illustrated in Fig. 16, and Fig. 18 discloses four conductors arranged for a T-welding operation.

The apparatus comprises a chambered main frame 2, having an overhanging arm 3 equipped with a pivoted lever or other suitable means to raise and depress a pair of juxtaposed electrodes 5 and 6 relatively to a similar pair of stationary electrodes 7 and 8. As shown, the stationary electrodes are clamped between two copper conductors or horns 9 and 10, jointly supported by a projecting arm 11 on the main frame. The movable electrodes 5 and 6 are detachably secured between two copper conductors or clamping members 12 and 13 fixed side by side within the foot of the reciprocable member 14 and these clamping members are in close juxtaposition but electrically insulated from each other to permit separate electric currents to be conducted to the electrodes 5 and 6. Thus, the juxtaposed electrodes are electrically insulated by a lamina 15 of suitable material having heat-resisting and electric non-conducting properties, see Fig. 14, and each electrode is semi-circular in cross-section (see Fig. 5) and beveled on its rounded side at the contact end thereof. The clamping extremities of the four separate conductors are channeled to seat and hold the electrodes in upright alinement with each other, the insulating lamina 15 being on the longitudinal median line of the juxtaposed electrodes and their respective conductors. The juxtaposed conductors are also electrically insulated from each other substantially their full length, by a strip 16 of insulating material, and a strip 17 of insulation is also secured upon and covers the top faces of the copper bars comprising the conductors or horns 9 and 10. A seat 18 of insulation is also provided upon the channeled arm 11 for said conductors, see Fig. 4. The clamping members 12 and 13 are also insulated from each other and from their common support 14 by insulation in the same manner as the horns 9 and 10, and each clamping member is independently connected to a terminal of the secondaries of an electric-current transformer which is mounted within the chambered main frame 2 and which comprises a single primary winding 19 and two secondary bands or coils 20 and 21 arranged in spaced insulated relation to each other about said primary winding. The positive ends of said secondaries are separately secured to the clamping members 12 and 13 of bolts 22, and the negative terminals of said secondaries are clamped in direct contact with the separate conductors or horns 9 and 10 by a plate 23 and bolts 24, see Fig. 3.

Now in order to cross the electric currents in the work and to bring the positives of said currents on one and the same side of the work and the negatives of each current on the opposite side of the work, I connect two of the four ends of the two secondaries on crossed lines with two of the juxtaposed conductors or clamping members for one set of electrodes. In the present instance, the negative ends of the two secondaries 20 and 21 are each provided with an angular terminal 25 and 26 respectively, placed in crossed and spaced relation and connected with the horns or members 9 and 10, terminal 25 uniting secondary 20 and member 10, and terminal 26 uniting secondary 21 and member 9, see Fig. 2. The upper or positive ends of the two secondaries are not crossed but extend on straight parallel lines and unite with the clamping members 12 and 13 directly in line therewith. Therefore, in operation, the positives of two separate electric welding currents are on one side of the work and the negatives on the other side with the co-working electrodes of each set diagonally related, thereby causing the two currents to pass transversely through the work on bias intersecting lines, substantially as shown by the arrows and dotted lines in Fig. 14. In this way it is possible to reduce the amount of current passing through each set of electrodes and prevent overheating and wear of the electrode points while still obtaining the necessary heating effect to weld the pieces together by crossing the two currents at the desired place of union in the work. The pressure which is applied and the expansion of the metal in heating causes a slight bulging of the metal at the surfaces between the juxtaposed electrodes, and the electrodes also indent the metal slightly at each side of the narrow rib or ridge formed by the bulging metal. The weld in the meeting faces of the metal pieces is elongated and extends across or at right angles to the rib or ridge formed in the outer faces, and the amount of material homogeneously united is of greater extent and strength than where only a single set of electrodes and a single current of equal volume to the two currents is employed.

The electrodes may be straight or bent, and a double electrode 28 having a double bend at its middle is shown in Fig. 9. The two pieces forming a double electrode may be dovetailed together as shown in Fig. 12, or a round locking wire 29 may be used to aline the pieces, see Fig. 11. Each pair of electrodes, either bent or straight, may also be secured together by a separate interlocking member 30 substantially as shown in Fig. 13. The clamping members for the electrodes may also be modified in various ways, for example in Figs. 7 and 8 I show two half-round clamping bars 31 and 32 separated by a flat strip 33 of insulation and covered by an insulating sleeve 34, and a round metal tube 35 binds and holds the said parts rigidly together. The channeled clamping ends are spaced apart and adapted to be drawn together by a screw 36 as shown in Figs. 5 and 6. This screw has an insulated bearing 37 in one of the clamping members and a screw-threaded thimble or nut 38 of hard metal in the other member.

Figure 18:
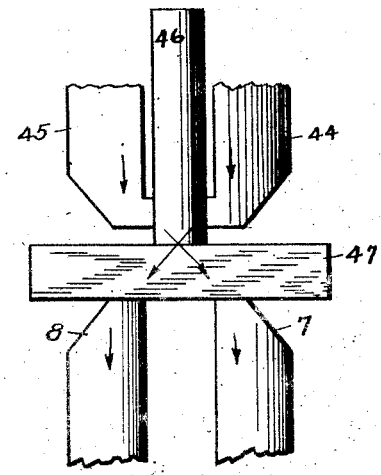

Butt-welds may also be made with this apparatus by crossing the current at the meeting surfaces of weldable pieces of metal. Thus in Fig. 15 I show two iron bars 40 and 41 in abutting relation, bar 40 being secured between the two clamping members 12 and 13, and bar 41 clamped between the two horn conductors 9 and 10. Very little current is required and the work heats very quickly and uniformly. In Fig. 16, I show two metal bars for plates 42 and 43 in abutting relation and engaged by two sets of diagonally-related electrodes which are connected in the two independent secondary circuits as hereinbefore described. A perspective view of the welded plates 42 and 43 is also shown in Fig. 17, and I have welded heavy plates one and one-fourth (1¼) inches in thickness in this way on a small machine with very good results. In Fig. 18, I show a T or jump-welding operation in which I use two conductors or clamping members 44 and 45 corresponding to the clamping members 12 and 13 wherewith to clamp the end of a bar 46 of iron against one side face of a second bar 47 of metal and opposite a pair of conductors or electrodes 7 and 8 engaged with the bottom face of said bar 47. These four conductors when connected in two separate secondary circuits as shown in Fig. 15, will pass two electric-currents on bias intersecting lines through the work and weld the abutting surfaces of the pieces 46 and 47 together in one operation with the use of less current and in less time than with any other apparatus known to me.

I prefer to use an electric current transformer constructed substantially as described, but I may use in lieu thereof two separate transformers.

What I claim is:

1. An electric welding apparatus, comprising separate sets of diagonally-related welding electrodes, means to bring said sets of electrodes in contact with collocated pieces of metal, and means to place the respective sets of diagonally-related electrodes, in independent electric welding circuits.

2. An electric welding apparatus, comprising opposed pairs of juxtaposed electrodes, juxtaposed clamping members for each pair of electrodes, an electrical transformer connection for each clamping member, and means to raise and depress one of said pairs of juxtaposed electrodes relatively to the other pair of electrodes.

3. An electric welding apparatus, comprising a multiple of diagonally and oppositely related electrodes, separate electric-current conductors for said electrodes, means to pass separate electric currents through the diagonally related electrodes, and means to impart pressure to the work through the oppositely-related electrodes.

4. An electric welding apparatus, comprising opposed pairs of juxtaposed electrodes in insulated relation, and two transformer secondaries and separate electric-current conductors in crossed connection for passing two electric welding currents through the work between diagonally related electrodes of said opposed pairs of electrodes.

5. An electric welding apparatus, comprising multiple electrodes of like polarity in juxtaposed insulated relation, clamping conductors in juxtaposed insulated relation for said electrodes, and a common movable support for and insulated from said juxtaposed electrodes and clamping conductors.

6. An electric welding apparatus, comprising a pair of juxtaposed positive electrodes, a pair of juxtaposed negative electrodes mounted opposite said positive electrodes, and crossed transformer connections for each pair of electrodes, to pass separate welding currents on bias intersecting lines through the work.

7. An electric welding apparatus, comprising separate sets of welding electrodes, having separate transformer connections for passing separate welding currents on bias intersecting lines through the work.

8. An electric welding apparatus, comprising two sets of welding electrodes and means to distribute two separate electric welding currents thereto, the positives of said currents being conducted to the electrodes on one side of the work and the negatives of said currents being conducted to the electrodes on the opposite side of the work and the negative and positive electrodes of each set being diagonally-related to pass the currents on bias intersecting lines through the work.

9. An electric welding apparatus, comprising opposed pairs of juxtaposed electrodes and two electric welding circuits therefor, one pair of juxtaposed electrodes being connected to the positive terminals of said circuits and having a common clamping device and the opposed pair of juxtaposed electrodes being connected to the negative terminals of said circuits, and having a common clamping device, the clamping devices being insulated from each other and the electrodes of said pair of juxtaposed electrodes being in insulated relation.

10. An electric welding apparatus, comprising a transformer having a single primary coil and a plural number of secondary coils, separate sets of welding electrodes, electrical conductors for said electrodes, and crossed terminals connecting each secondary coil with said electrodes.

11. An electric welding apparatus, comprising two sets of welding electrodes, separate conductors to distribute separate electric welding currents to said sets of electrodes and an electric welding current transformer having two separate secondary coils provided with two corresponding terminals united in crossed connection with two of said separate conductors.

12. An electric welding apparatus, comprising a divided clamping member and a divided electrode clamped therein, the divisional parts being electrically insulated on the longitudinal median line thereof.

13. An electric welding apparatus, comprising a support and two electric-current conductors mounted in insulated juxtaposition thereon, a clamping device for said conductors, separate transformer connections for said conductors, and separate electrodes clamped in insulated juxtaposition between said conductors.

14. An electric welding apparatus, comprising a supporting member, a pair of electric-current conductors mounted in insulated juxtaposition upon said member, a clamping device for said conductors, separate electrodes clamped in insulated juxtaposition between said conductors, and separate electric terminal connections extending in crossed relation to each other from said conductors.

15. An electric welding apparatus, comprising two electric-current conducting bars having juxtaposed electrode-clamping extremities, insulating material between said bars, means to unite the said bars and insulating material rigidly together, and a separate electrical terminal connection for each bar.

16. An electric welding apparatus, comprising two electric-current conducting bars having insulation therebetween and provided with juxtaposed electrode holding extremities, clamping means for said extremities, an insulating sleeve for said bars and a metal tube inclosing said sleeve and bars.

17. An electric welding apparatus, comprising a frame, a horn extending from said frame, made of two electric-current conducting bars insulated from each other and said frame, a pair of juxtaposed electrodes carried by said horn, a pair of clamping conductors and a movable support therefor mounted opposite said horn, a pair of juxtaposed electrodes carried by said clamping conductors, means to actuate said movable support, and an electric-current transformer mounted on said frame having double secondary coils connected with said bars and conductors.

18. An electric welding apparatus, comprising a double electrode having a separating lamina of insulating material, a pair of clamping conductors for said electrodes in insulated juxtaposition, and a clamping screw uniting said conductors and insulated therefrom.

19. An electric welding apparatus, comprising a double electrode, a pair of juxtaposed channeled clamping bars and a screw to secure the electrodes together in juxtaposed insulated relation, an insulated bearing in one of said bars for said screw, and a nut for said screw engaging the other bar.

20. An electric welding apparatus, comprising two electrodes keyed together in juxtaposed insulated relation.

21. An electric welding apparatus, comprising two electrodes having an insulated dove-tailed union lengthwise thereof.

22. An electric welding apparatus, comprising an electric-current transformer having a single primary and two separate secondaries, each secondary having two terminals and one of the terminals of one secondary being crossed relatively to one of the terminals of the other secondary.

Signed at Warren, in the county of Trumbull, and State of Ohio, this 13 day of July, 1917.

ALBERTIS C. TAYLOR.